US012615467B2

(12) United States Patent 
Yang

(10) Patent No.: US 12,615,467 B2 
(45) Date of Patent: Apr. 28, 2026

(54) CHARGING METHOD AND SYSTEM, CHARGING BOX, AND BLUETOOTH EARPHONES

(71) Applicant: GOERTEK INC., Shandong (CN)

(72) Inventor: Zongxu Yang, Shandong (CN)

(73) Assignee: GOERTEK INC., Shandong (CN)

( * ) Notice: Subject to any disclaimer, the term of this patent is extended or adjusted under 35 U.S.C. 154(b) by 813 days.

(21) Appl. No.: 17/996,410

(22) PCT Filed: Oct. 30, 2020

(86) PCT No.: PCT/CN2020/125038 
§ 371 (c)(1), 
(2) Date: Oct. 17, 2022

(87) PCT Pub. No.: WO2021/212800 
PCT Pub. Date: Oct. 28, 2021

(65) Prior Publication Data 
US 2023/0217148 A1 Jul. 6, 2023

(30) Foreign Application Priority Data

Apr. 22, 2020 (CN) .......................... 202010325164.7

(51) Int. Cl. 
*H01M 10/44* (2006.01) 
*H02J 7/00* (2006.01) 
(Continued)

(52) U.S. Cl. 
CPC ........ *H04R 1/1025* (2013.01); *H02J 7/00034* (2020.01); *H02J 7/0044* (2013.01); 
(Continued)

(58) Field of Classification Search 
CPC .... H02J 7/00032; H02J 7/0047; H02J 7/0044; H02J 7/00034 
(Continued)

(56) References Cited

U.S. PATENT DOCUMENTS

2017/0256973 A1 9/2017 Kim et al.

FOREIGN PATENT DOCUMENTS

CN 104967200 A 10/2015 
CN 104993562 A 10/2015 
(Continued)

*Primary Examiner* — Edward Tso 
(74) *Attorney, Agent, or Firm* — Ingrassia Fisher & Lorenz, LLP

(57) ABSTRACT

A charging method and system, a charging box and Bluetooth earphones are disclosed. The charging method is applied to the charging box, and comprises: acquiring a communication data packet of Bluetooth earphones according to a preset communication frequency when the charging box is charging the Bluetooth earphones, wherein the communication data packet includes a current battery voltage of the Bluetooth earphones (S10); determining a target charging voltage according to the current battery voltage (S20); and charging the Bluetooth earphones based on the target charging voltage (S30). The charging method can realize the dynamic adjustment of the charging voltage, reduce the energy loss of the charging box during the charging process, thereby increasing the number of times that the charging box can charge the Bluetooth earphones and improving the battery life of the Bluetooth earphones.

9 Claims, 3 Drawing Sheets

(51) Int. Cl.
H04R 1/1025        (2026.01)
H04W 4/80        (2018.01)

(52) U.S. Cl.
CPC .... H02J 7/007182 (2020.01); H04R 2460/17 (2013.01); H04W 4/80 (2018.02)

(58) Field of Classification Search
USPC ........................................ 320/107, 114, 132
See application file for complete search history.

(56)                References Cited

FOREIGN PATENT DOCUMENTS

| | | | |
|---|---|---|---|
| CN | 105098945 | A | 11/2015 |
| CN | 106598809 | A | 4/2017 |
| CN | 107733000 | A | 2/2018 |
| CN | 108574123 | A | 9/2018 |
| CN | 110797601 | A | 2/2020 |
| CN | 111509800 | A | 8/2020 |
| CN | 213754015 | U  * | 7/2021 |

* cited by examiner

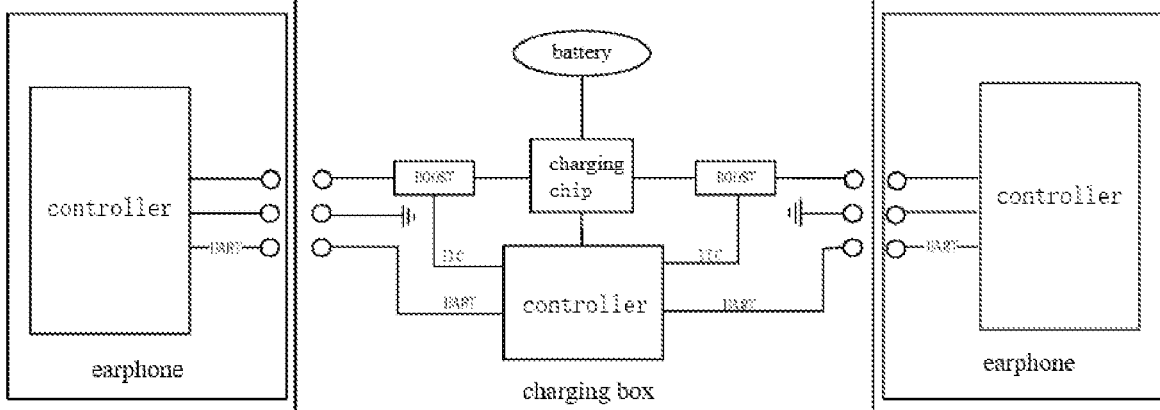
FIG. 3
FIG. 4
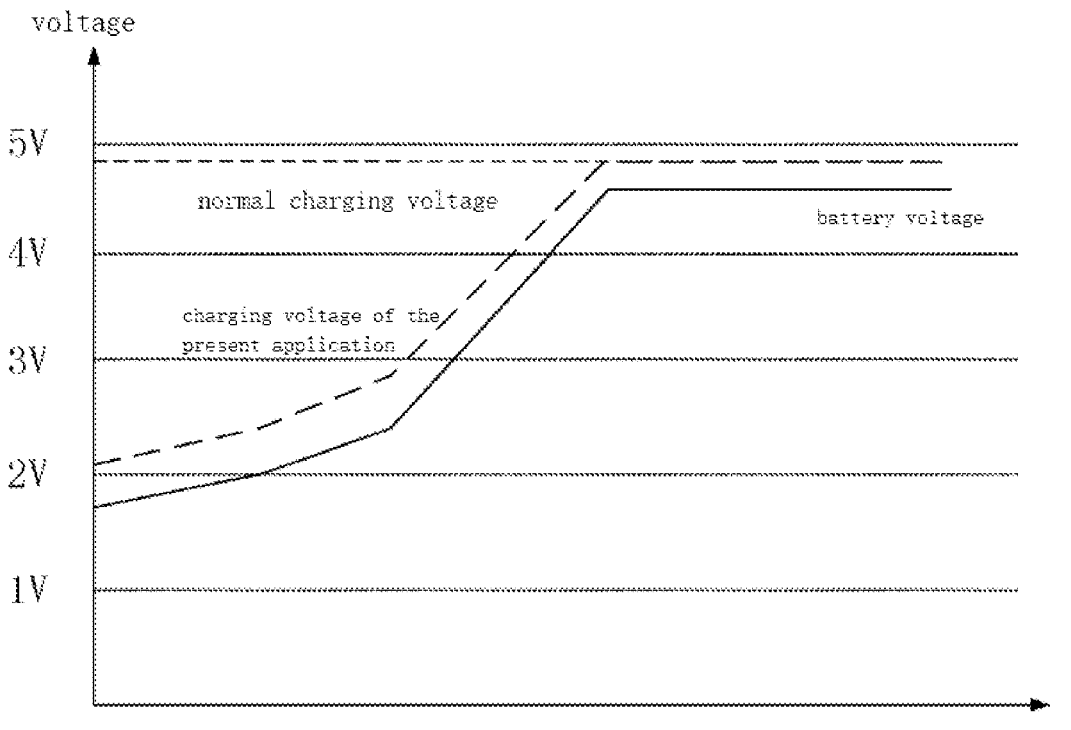

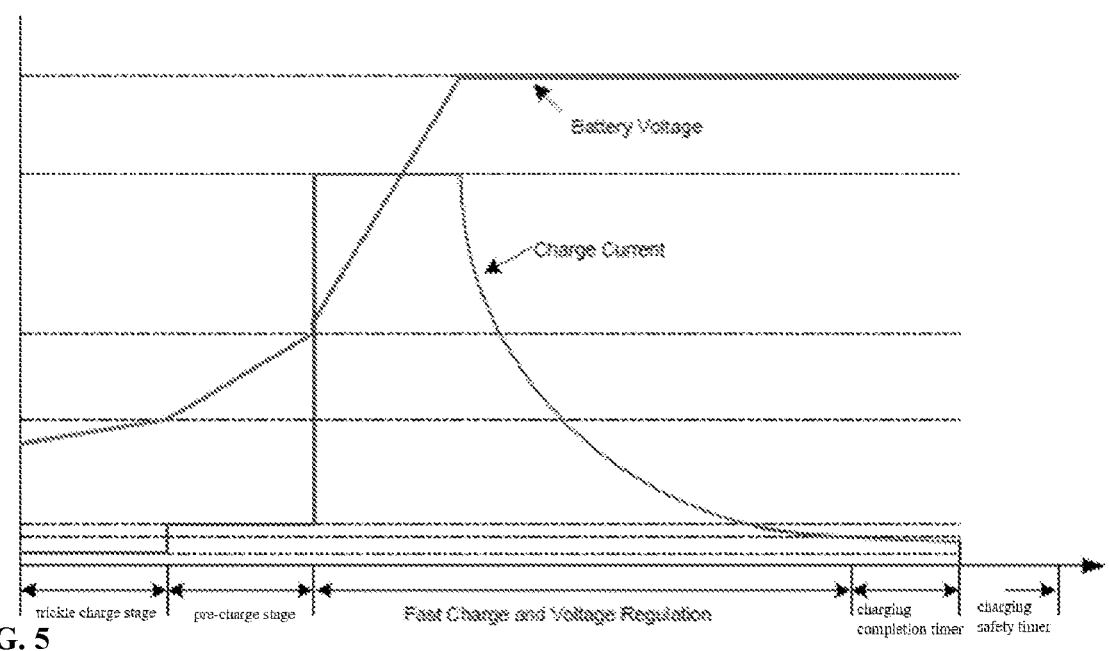

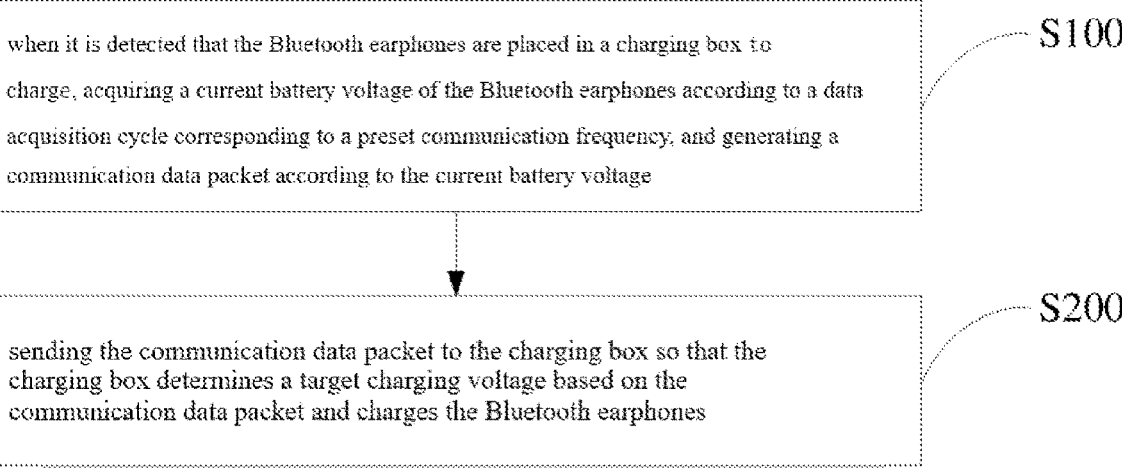

when it is detected that the Bluetooth earphones are placed in a charging box to charge, acquiring a current battery voltage of the Bluetooth earphones according to a data acquisition cycle corresponding to a preset communication frequency, and generating a communication data packet according to the current battery voltage     S100 sending the communication data packet to the charging box so that the charging box determines a target charging voltage based on the communication data packet and charges the Bluetooth earphones     S200

FIG. 7

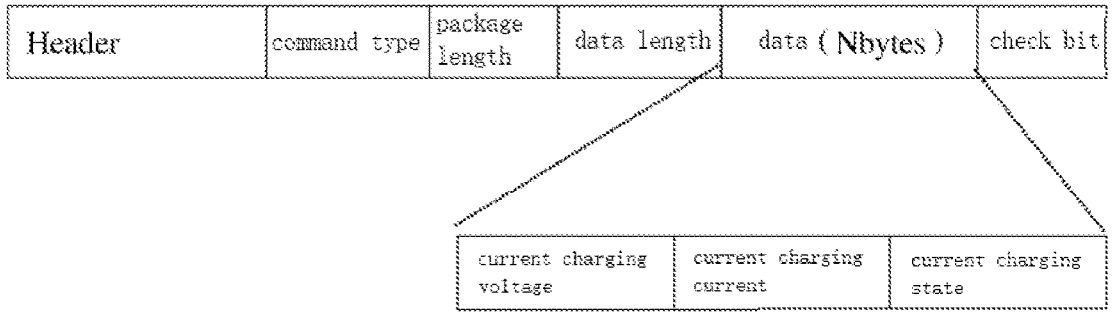

| Header | command type | package length | data length | data ( Nbytes ) | check bit |
|--------|-------------|----------------|-------------|-----------------|-----------|

| current charging voltage | current charging current | current charging state |
|--------------------------|--------------------------|------------------------|

CHARGING METHOD AND SYSTEM, CHARGING BOX, AND BLUETOOTH EARPHONES

CROSS-REFERENCE TO RELATED APPLICATIONS

This Application is a U.S. National-Stage entry under 35 U.S.C. § 371 based on International Application No. PCT/CN2020/125038, filed Oct. 30, 2020 which was published under PCT Article 21(2) and which claims priority to Chinese Application No. 202010325164.7, filed Apr. 22, 2020, which are all hereby incorporated herein in their entirety by reference.

TECHNICAL FIELD

This application pertains to the technical field of portable listening devices, in particular to a charging method and system, a charging box and Bluetooth (short distance wireless) earphones.

BACKGROUND

With the development of Bluetooth technology, intelligent and wireless trends have been deeply affected Bluetooth earphones products. As one of perfect combinations of intelligent and wireless trends, TWS (true wireless stereo) earphones have become the most popular product form in the current Bluetooth earphones market.

With the rapid development of Bluetooth earphones such as TWS earphones, the requirements of users for wearing comfort and long battery life of Bluetooth earphones are further increased. How to increase the number of times that the charging box can charge the Bluetooth earphones and improve the battery life of the Bluetooth earphones without increasing the sizes of the Bluetooth earphones and the charging box is an urgent problem to be solved. In addition, other objects, desirable features and characteristics will become apparent from the subsequent summary and detailed description, and the appended claims, taken in conjunction with the accompanying drawings and this background.

SUMMARY

The main object of the present disclosure is to provide a charging method and system, a charging box and Bluetooth earphones, which aim to reduce the energy loss of the charging box during the charging process, thereby increasing the number of times that the charging box can charge the Bluetooth earphones and improving the battery life of the Bluetooth earphones.

To achieve the above object, the present disclosure provides a charging method applied to a charging box, and the charging method comprises:

acquiring a communication data packet of Bluetooth earphones according to a preset communication frequency when the charging box is charging the Bluetooth earphones, wherein the communication data packet includes a current battery voltage of the Bluetooth earphones;

determining a target charging voltage according to the current battery voltage; and charging the Bluetooth earphones based on the target charging voltage.

Optionally, the step of determining the target charging voltage according to the current battery voltage comprises:

obtaining the target charging voltage by adding the current battery voltage and a preset incremental voltage.

Optionally, the step of determining the target charging voltage according to the current battery voltage comprises:

determining a target battery voltage range corresponding to the current battery voltage according to a preset battery voltage range;

determining a target incremental voltage corresponding to the target battery voltage range according to a mapping relationship between the preset battery voltage range and an incremental voltage; and obtaining the target charging voltage by adding the current battery voltage and the target incremental voltage.

Optionally, the communication data packet also includes a current charging state of the Bluetooth earphones, and the charging method further comprises:

determining a target communication frequency according to the current charging state; and adjusting the preset communication frequency to the target communication frequency, and acquiring the communication data packet of the Bluetooth earphones according to the target communication frequency.

Optionally, the charging method further comprises:

when the charging is completed, stopping charging the Bluetooth earphones.

In addition, in order to achieve the above object, the present disclosure also provides a charging method applied to Bluetooth earphones, and the charging method comprises the following steps:

when it is detected that the Bluetooth earphones are placed in a charging box for charging, acquiring a current battery voltage of the Bluetooth earphones according to a data acquisition cycle corresponding to a preset communication frequency, and generating a communication data packet according to the current battery voltage; and sending the communication data packet to the charging box so that the charging box determines a target charging voltage based on the communication data packet and charges the Bluetooth earphones.

Optionally, the step of generating a communication data packet according to the current battery voltage comprises:

comparing the current battery voltage with a previous current battery voltage, and determining a current charging state of the Bluetooth earphones according to a comparison result; and generating a communication data packet according to the current charging state and the current battery voltage.

Optionally, the charging method further comprises:

acquiring a target communication frequency when communication frequency adjustment of the charging box has been detected, and adjusting the data acquisition cycle based on the target communication frequency; and acquiring the current battery voltage of the Bluetooth earphones according to a adjusted data acquisition cycle.

In addition, in order to achieve the above object, the present disclosure also provides a charging box. The charging box comprises a memory, a processor and a charging program stored on the memory and operable on the processor. When the charging program is executed by the processor, the steps of the first type of charging method as described above are realized.

In addition, in order to achieve the above object, the present disclosure also provides Bluetooth earphones. The Bluetooth earphones comprise a memory, a processor and a charging program stored on the memory and operable on the processor. When the charging program is executed by the processor, the steps of the second type of charging method as described above are realized.

In addition, in order to achieve the above object, the present disclosure also provides a charging system which comprises a charging box and Bluetooth earphones, wherein
    the charging box is a charging box as described above; and
    the Bluetooth earphones are the Bluetooth earphones as described above.

In addition, in order to achieve the above object, the present disclosure also provides a computer-readable storage medium on which a charging program is stored, and when the charging program is executed by a processor, the steps of the first or second type of charging method as described above are realized.

The present disclosure provides a charging method and system, a charging box and Bluetooth earphones. The charging method is applied to the charging box. When the charging box is charging the Bluetooth earphones, the communication data packet of the Bluetooth earphones is acquired according to the preset communication frequency, and the communication data packet includes the current battery voltage of the Bluetooth earphones; the target charging voltage is determined according to the current battery voltage; the Bluetooth earphones are charged based on the target charging voltage. In the present disclosure, the target charging voltage can be determined according to the current battery voltage of the Bluetooth earphones, and then the Bluetooth earphones can be charged based on the target charging voltage, thereby realizing the dynamic adjustment of the charging voltage of the charging box. Compared with using a fixed normal charging voltage, the energy loss of the charging box during the charging process can be reduced, so that the number of times that the charging box can charge the Bluetooth earphones can be increased, and the battery life of the Bluetooth earphones can be improved.

BRIEF DESCRIPTION OF DRAWINGS

The present invention will hereinafter be described in conjunction with the following drawing figures, wherein like numerals denote like elements, and:

FIG. 3 is a schematic diagram of the system architecture of a charging system according to the charging method of the present disclosure;

FIG. 4 is a schematic diagram of a charging voltage in a charging process according to the present disclosure and a conventional charging process;

FIG. 5 is a schematic diagram of a battery charging curve involved in a charging method according to the present disclosure;

FIG. 6 is a flowchart of a first embodiment of a charging method applied to Bluetooth earphones according to the present disclosure; and FIG. 7 is a schematic diagram of a data structure of a communication data packet involved in a charging method according to the present disclosure.

The realization of the object, characteristics of functions and advantages of the present disclosure will be further described in conjunction with the embodiments and with reference to the drawings.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

It should be understood that the specific embodiments described herein are only used to explain the present disclosure and are not used to define the present disclosure.

In the prior art, with the rapid development of Bluetooth earphones such as TWS earphones, the requirements of users for wearing comfort and long battery life of Bluetooth earphones are further increased. How to increase the number of times that the charging box can charge the Bluetooth earphones and improve the battery life of the Bluetooth earphones without increasing the sizes of the Bluetooth earphones and the charging box is an urgent problem to be solved.

In order to solve the above technical problems, the present disclosure provides a charging method applied to a charging box. When the charging box is charging Bluetooth earphones, the communication data packet of the Bluetooth earphones is acquired according to the preset communication frequency, and the communication data packet includes the current battery voltage of the Bluetooth earphones. The target charging voltage is determined according to the current battery voltage. The Bluetooth earphones are charged based on the target charging voltage. In the present disclosure, the target charging voltage can be determined according to the current battery voltage of the Bluetooth earphones, and then the Bluetooth earphones can be charged based on the target charging voltage, thereby realizing the dynamic adjustment of the charging voltage of the charging box. Compared with using a fixed normal charging voltage, the energy loss of the charging box during the charging process can be reduced, so that the number of times that the charging box can charge the Bluetooth earphones can be increased, and the battery life of the Bluetooth earphones can be improved.

Figure 1:
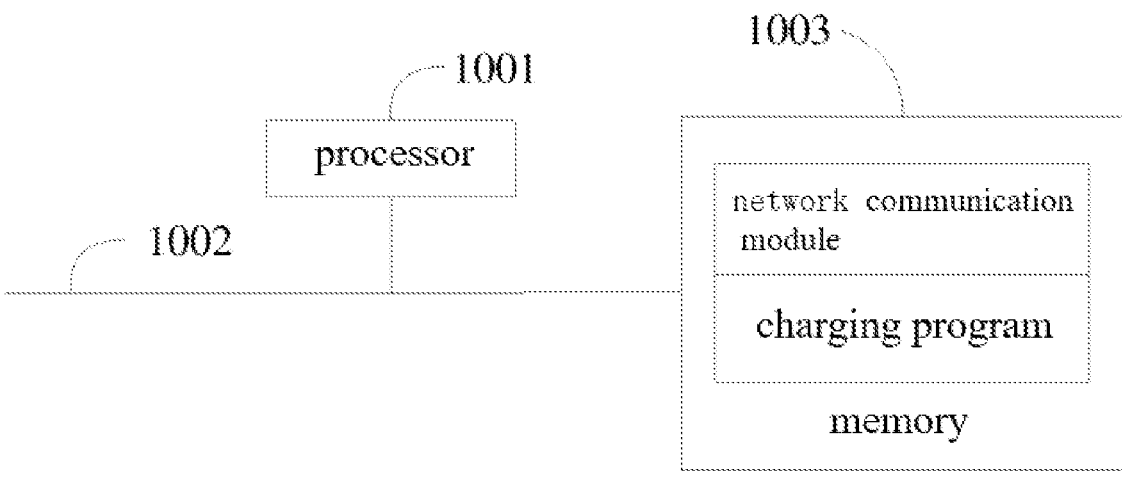
FIG. 1 is a schematic diagram of the terminal structure of the hardware operating environment involved in the embodiments of the present disclosure.

Referring to FIG. 1, which is a schematic diagram of the terminal structure of the hardware operating environment involved in the embodiments of the present disclosure.

In the embodiments of the present disclosure, the terminal is a charging box of Bluetooth earphones or Bluetooth earphones.

As shown in FIG. 1, the terminal may comprise a processor 1001 such as a CPU (central processing unit), a communication bus 1002, and a memory 1003. The communication bus 1002 is configured to realize the connection and communication between these components. The memory 1003 may be a high-speed RAM memory or a stable memory (non-volatile memory), such as a magnetic disk memory. Alternatively, the memory 1003 may be a storage device independent of the above processor 1001.

Those skilled in the art can understand that the terminal structure shown in FIG. 1 does not constitute a limitation on the terminal, and the terminal may comprise more or fewer components than those shown in the FIG. 1, or be a combination of some components, or have different component arrangements.

As shown in FIG. 1, the memory 1003, as a computer storage medium, may comprise a network communication module and a charging program.

In the terminal shown in FIG. 1, if the terminal is the charging box of Bluetooth earphones, the processor 1001 may be configured to call the charging program stored in the memory 1003 and perform the following operations:

acquiring a communication data packet of Bluetooth earphones according to a preset communication frequency when the charging box is charging the Bluetooth earphones, wherein the communication data packet includes a current battery voltage of the Bluetooth earphones;

determining a target charging voltage according to the current battery voltage; and charging the Bluetooth earphones based on the target charging voltage.

Further, the processor 1001 may call the charging program stored in the memory 1003 and perform the following operations:

obtaining the target charging voltage by adding the current battery voltage and a preset incremental voltage.

Further, the processor 1001 may call the charging program stored in the memory 1003 and perform the following operations:

determining a target battery voltage range corresponding to the current battery voltage according to a preset battery voltage range;

determining a target incremental voltage corresponding to the target battery voltage range according to a mapping relationship between the preset battery voltage range and an incremental voltage; and obtaining the target charging voltage by adding the current battery voltage and the target incremental voltage.

Further, the communication data packet also includes the current charging state of the Bluetooth earphones. The processor 1001 may call the charging program stored in the memory 1003 and also perform the following operations:

determining a target communication frequency according to the current charging state; and adjusting the preset communication frequency to the target communication frequency, and acquiring the communication data packet of the Bluetooth earphones according to the target communication frequency.

Further, the processor 1001 may call the charging program stored in the memory 1003 and perform the following operations:

when the charging is completed, stopping charging the Bluetooth earphones.

In the terminal shown in FIG. 1, if the terminal is Bluetooth earphones, the processor 1001 may be configured to call the charging program stored in the memory 1003 and perform the following operations:

when it is detected that the Bluetooth earphones are placed in a charging box for charging, acquiring a current battery voltage of the Bluetooth earphones according to a data acquisition cycle corresponding to a preset communication frequency, and generating a communication data packet according to the current battery voltage; and sending the communication data packet to the charging box so that the charging box determines a target charging voltage based on the communication data packet and charges the Bluetooth earphones.

Further, the processor 1001 may call the charging program stored in the memory 1003 and perform the following operations:

comparing the current battery voltage with a previous current battery voltage, and determining a current charging state of the Bluetooth earphones according to a comparison result; and generating a communication data packet according to the current charging state and the current battery voltage.

Further, the processor 1001 may call the charging program stored in the memory 1003 and perform the following operations:

acquiring a target communication frequency when communication frequency adjustment of the charging box has been detected, and adjusting the data acquisition cycle based on the target communication frequency; and acquiring the current battery voltage of the Bluetooth earphones according to an adjusted data acquisition cycle Based on the above hardware structure, various embodiments of the charging method of the present disclosure are proposed.

The present disclosure provides a charging method applied to a charging box.

Figure 2:
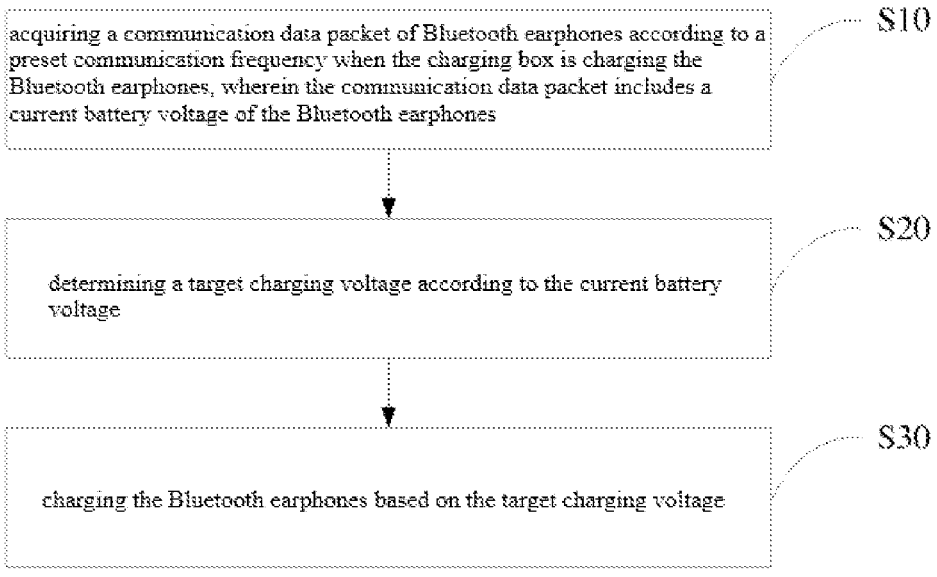
FIG. 2 is a flowchart of a first embodiment of a charging method applied to a charging box according to the present disclosure.

Referring to FIG. 2, which is a flowchart of the first embodiment of the charging method applied to a charging box according to the present disclosure.

In this embodiment, the charging method is applied to the charging box of the Bluetooth earphones. The charging method comprises:

Step S10: acquiring a communication data packet of Bluetooth earphones according to a preset communication frequency when the charging box is charging the Bluetooth earphones, wherein the communication data packet includes a current battery voltage of the Bluetooth earphones;

In this embodiment, when the charging box is charging the Bluetooth earphones, the communication data packet of the Bluetooth earphones is acquired according to the preset communication frequency, and the communication data packet includes the current battery voltage of the Bluetooth earphones. The preset communication frequency may be set according to actual needs, such as once every 30 s, once every 60 s, etc., which is not particularly limited herein. After the communication data packet of the Bluetooth earphones is acquired, the communication data packet may be parsed to obtain the current battery voltage of the Bluetooth earphones included therein.

It should be noted that this embodiment is applicable to wireless Bluetooth earphones charged through a charging box, such as TWS (true wireless stereo) earphones. As shown in FIG. 3, which is a schematic diagram of the system architecture of a charging system composed of a charging box and Bluetooth earphones. The Bluetooth earphones comprise a master earphone and a slave earphone, which can interact with the charging box independently. Specifically, they can communicate and interact with the charging box through many kinds of communication methods such as UART (universal asynchronous receiver/transmitter) or I2C (inter-integrated circuit) carrier. In addition, both the Bluetooth earphones have a voltage detection device (not shown in FIG. 3) therein configured to obtain the current battery voltage of the Bluetooth earphones. Of course, they may also have a current detection device configured to acquire the current charging current of the Bluetooth earphones. When the Bluetooth earphones are placed in the charging box for charging, they will acquire the current battery voltage of the Bluetooth earphones according to a data acquisition cycle corresponding to a preset communication frequency, generate a communication data packet according to the current battery voltage, and then send the communication data packet to the charging box. At this point, the charging box can obtain the communication data packet of the Bluetooth earphones. It can be understood that in a specific embodiment, the communication data packet may be actively sent to the charging box by the Bluetooth earphones, or may be acquired from the Bluetooth earphones by the charging box according to the preset communication frequency.

Step S20: determining a target charging voltage according to the current battery voltage;

After acquiring the current battery voltage of the Bluetooth earphones, the target charging voltage is determined according to the current battery voltage.

As one of the methods for determining the target charging voltage, the step S20 may comprise:

Step a21: obtaining the target charging voltage by adding the current battery voltage and a preset incremental voltage.

As one of the methods for determining the target charging voltage, a preset incremental voltage may be preset. The preset incremental voltage is a fixed value. By adding the current battery voltage and the preset incremental voltage, the target charging voltage can be obtained, that is, the target charging voltage=the current battery voltage+the preset incremental voltage.

As another method for determining the target charging voltage, the step S20 may comprise:

Step a22: determining a target battery voltage range corresponding to the current battery voltage according to a preset battery voltage range;

Step a23: determining a target incremental voltage corresponding to the target battery voltage range according to a mapping relationship between the preset battery voltage range and an incremental voltage; and Step a24: obtaining the target charging voltage by adding the current battery voltage and the target incremental voltage.

As another method for determining the target charging voltage, the target battery voltage range corresponding to the current battery voltage may be determined according to the preset battery voltage range, that is, the battery voltage range in which the current battery voltage is located is determined. Then, according to the mapping relationship between the preset battery voltage range and the incremental voltage, the target incremental voltage corresponding to the target battery voltage range is determined. The mapping relationship may be in the form of a table. For example, it may be set that each battery voltage interval corresponds to an incremental voltage. Of course, the mapping relationship may also be in the form of a calculation formula, and different battery voltage intervals correspond to different calculation formulas, which is not limited in the present disclosure. Finally, the current battery voltage and the target incremental voltage are added to obtain the target charging voltage, that is, the target charging voltage=the current battery voltage+the target incremental voltage.

The target incremental electric quantity is determined by the above method, and then the target charging voltage is obtained, which can realize the fine control of the charging voltage during the charging process. Compared with the previous method for determining the target charging voltage, the target charging voltage can be determined more finely by this method.

Step S30: charging the Bluetooth earphones based on the target charging voltage.

After the target charging voltage is determined, the Bluetooth earphones are charged based on the target charging voltage.

It should be noted that, in the prior art, when the Bluetooth earphones are charged by the charging box, typically a fixed normal charging voltage is used to charge Bluetooth earphones (as shown in FIG. 4). In the charging process, the energy loss of the charging box is the product of the power loss and time, and the power loss is proportional to the charging voltage, that is, the energy loss is proportional to the charging voltage. However, in this embodiment of the present disclosure, by dynamically adjusting the charging voltage of the charging box, as shown in FIG. 4, compared with using a fixed normal charging voltage in the prior art, the energy loss of the charging box during the charging process can be reduced, and the number of times that the charging box can charge the Bluetooth earphones can be increased, thereby improving the battery life of the Bluetooth earphones.

This embodiment of the present disclosure provides a charging method applied to the charging box. When the charging box is charging the Bluetooth earphones, the communication data packet of the Bluetooth earphones is acquired according to the preset communication frequency, and the communication data packet includes the current battery voltage of the Bluetooth earphones; the target charging voltage is determined according to the current battery voltage; the Bluetooth earphones are charged based on the target charging voltage. In this embodiment of the present disclosure, the target charging voltage can be determined according to the current battery voltage of the Bluetooth earphones, and then the Bluetooth earphones can be charged based on the target charging voltage, thereby realizing the dynamic adjustment of the charging voltage of the charging box. Compared with using a fixed normal charging voltage, the energy loss of the charging box during the charging process can be reduced, so that the number of times that the charging box can charge the Bluetooth earphones can be increased, and the battery life of the Bluetooth earphones can be improved.

Further, based on the above first embodiment, a second embodiment of the charging method applied to a charging box according to the present disclosure is proposed.

In this embodiment, the communication data packet also includes the current charging state of the Bluetooth earphones. After the above step S30, the charging method further comprises:

Step A: determining a target communication frequency according to the current charging state;

In this embodiment, the communication data packet also includes the current charging state of the Bluetooth earphones, and the charging box determines the target communication frequency according to the current charging state. As shown in the horizontal axis of FIG. 5, the current charging state can be divided into trickle charge stage, pre-charge stage, fast charge and voltage regulation stage, charging completion timer stage and charging safety timer stage. It can also be divided into trickle charge stage, pre-charge stage, constant current charging stage and constant voltage charging stage based on the horizontal axis in combination with the states of current and voltage. The constant current charging stage is the stage with constant charging current, and the constant voltage charging stage is the stage with constant charging voltage. In this embodiment, according to the charging states corresponding to the second division method, the mapping relationship between different charging states and communication frequencies is preset, and then the target communication frequency is determined according to the current charging state and the mapping relationship between charging states and communication frequencies. It can be understood that, in the constant current charging stage, the voltage changes fastest, and the corresponding communication frequency can be set to the fastest; in the constant voltage charging stage, the voltage remains unchanged, and the corresponding communication frequency can be set to the slowest.

Step B: adjusting the preset communication frequency to the target communication frequency, and acquiring the communication data packet of the Bluetooth earphones according to the target communication frequency.

After the target communication frequency is determined, the preset communication frequency may be adjusted to the target communication frequency, and the communication data packet of the Bluetooth earphones is acquired according to the target communication frequency, then the target charging voltage is determined according to the current battery voltage in the obtained communication data packet of the Bluetooth earphones, and the Bluetooth earphones are charged based on the target charging voltage. The specific execution process may refer to the above first embodiment.

In this embodiment, by dynamically adjusting the communication frequency between the charging box and the Bluetooth earphones according to the current charging state of the Bluetooth earphones, the charging voltage can be adjusted more accurately, thereby further reducing the energy loss of the charging box during the charging process and improving the battery life of the Bluetooth earphones.

Further, based on the above first embodiment, a third embodiment of the charging method applied to a charging box according to the present disclosure is proposed.

In this embodiment, after the above step S30, the charging method further comprises:

Step C: when the charging is completed, stopping charging the Bluetooth earphones.

In this embodiment, when the charging is completed, the charging box can stop charging the Bluetooth earphones. In this way, overcharging of the Bluetooth earphones can be avoided, thereby avoiding the damage to the battery performance of the Bluetooth earphones.

The present disclosure also provides a charging method applied to Bluetooth earphones.

Referring to FIG. 6, which is a flowchart of the first embodiment of the charging method applied to Bluetooth earphones of the present disclosure.

In this embodiment, the charging method is applied to Bluetooth earphones. The charging method comprises:

Step S100: when it is detected that the Bluetooth earphones are placed in a charging box for charging, acquiring a current battery voltage of the Bluetooth earphones according to a data acquisition cycle corresponding to a preset communication frequency, and generating a communication data packet according to the current battery voltage;

In this embodiment, when it is detected that the Bluetooth earphones are placed in a charging box for charging, a current battery voltage of the Bluetooth earphones is acquired according to a data acquisition cycle corresponding to a preset communication frequency, and a communication data packet is generated according to the current battery voltage. The data acquisition cycle for the Bluetooth earphones to acquire the current battery voltage corresponds to the preset communication frequency. For example, when the preset communication frequency is once every 30 s, the corresponding data acquisition cycle may be set to every 30 s.

When the communication data packet is generated according to the current battery voltage, the communication data packet may be directly generated according to the current battery voltage and the data structure of the preset communication data packet. Alternatively, the current battery voltage may be compared with the previous current battery voltage, the current charging state of the Bluetooth earphones is determined according to the comparison result, and then a communication packet is generated according to the current charging state, the current battery voltage and the data structure of the preset communication packet. The process of determining the current charging state may refer to the following second embodiment.

The data structure of the communication data packet may refer to FIG. 7. If only the current battery voltage of the Bluetooth earphones is transmitted, only the current battery voltage needs to be filled in the data part of the data structure. If the current battery voltage and the current charging state of the Bluetooth earphones need to transmit, the current battery voltage and the current charging state need to be filled in the data part of the data structure. In specific implementation, besides the current battery voltage and the current charging state, the data part may also include the current charging current.

Step S200: sending the communication data packet to the charging box so that the charging box determines a target charging voltage based on the communication data packet and charges the Bluetooth earphones.

After the communication data packet is generated according to the current battery voltage, the communication data packet is sent to the charging box, so that the charging box can determine the target charging voltage based on the communication data packet and charge the Bluetooth earphones. Correspondingly, charging box executing the process of charging based on the communication data packet may refer to the above embodiments of the charging method applied to the charging box.

In this embodiment of the present disclosure, when it is detected that the Bluetooth earphones are placed in a charging box for charging, a current battery voltage of the Bluetooth earphones is acquired according to a data acquisition cycle corresponding to a preset communication frequency, and a communication data packet is generated according to the current battery voltage; then, the communication data packet is sent to the charging box, so that the charging box can determine the target charging voltage based on the communication data packet and charge the Bluetooth earphones. In this way, it is convenient for the charging box to dynamically adjust the charging voltage of the charging box based on the current battery voltage transmitted by the Bluetooth earphones. Compared with using a fixed normal charging voltage, it can reduce the energy loss of the charging box during the charging process, thereby increasing the number of times that the charging box can charge the Bluetooth earphones and improving the battery life of the Bluetooth earphones.

Further, based on the above first embodiment of the charging method applied to Bluetooth earphones, a second embodiment of the charging method applied to Bluetooth earphones according to the present disclosure is proposed.

In this embodiment, the above step of "generating a communication packet according to the current battery voltage" comprises:

Step a101: comparing the current battery voltage with a previous current battery voltage, and determining a current charging state of the Bluetooth earphones according to a comparison result; and Step a102: generating a communication data packet according to the current charging state and the current battery voltage.

In this embodiment, after obtaining the current battery voltage of the Bluetooth earphones, the Bluetooth earphones compare the current battery voltage with the previous current battery voltage. The comparison methods may include but are not limited to: (1) calculating the ratio of the current battery voltage to the previous current battery voltage; (2) calculating the voltage growth rate according to the current battery voltage and the previous current battery voltage, specifically, the voltage growth rate=(the current battery voltage−the previous current battery voltage)/the previous current battery voltage. Then, the current charging state of the Bluetooth earphones is determined according to a comparison result. The current charging state may include trickle charge stage, pre-charge stage, constant current charging stage and constant voltage charging stage. Specifically, a threshold range in which the comparison result is located may be determined first, and then the corresponding charging state may be determined according to the threshold range. For example, taking the calculation ratio as an example, when the ratio is 1, the corresponding charging state may be determined as the constant voltage charging state.

After determining the current charging state of the Bluetooth earphones, a communication data packet is generated according to the current charging state and the current battery voltage, and then the communication data packet is sent to the charging box, so that the charging box can determine the target communication frequency according to the current charging state in the communication data packet, and then adjust the preset communication frequency to the target communication frequency. At the same time, it is convenient for the charging box to determine the target charging voltage according to the current battery voltage, and then charge the Bluetooth earphones based on the target charging voltage.

It should be noted that, in specific implementation, the Bluetooth earphones may also acquire the current charging current, and determine the current charging state based on the current charging current and the comparison result of the current charging current and the previous current charging current. As shown in FIG. 5, the current in the trickle charge stage, the pre-charge stage and the constant current charging stage is unchanged, but the current values in these stages are different; the current in the constant voltage charging phase is continuously decreasing. Therefore, it can be preliminarily determined whether the Bluetooth earphones are in the constant voltage charging stage according to the comparison result of the current charging current and the previous current charging current. For example, it is detected whether the ratio of the current charging current to the previous current charging current is less than 1. If not, it is further determined whether the Bluetooth earphones are in the trickle charge stage, the pre-charge stage or the constant current charging stage according to the threshold range corresponding to the current charging current.

Of course, it can be understood that, in specific implementation, the current charging state of the Bluetooth earphones may be determined based on the combination of more than one parameter among the current charging voltage, the current charging current, the previous charging voltage and the previous charging current.

In this way, the current charging state of the Bluetooth earphones can be determined based on the current charging voltage and the previous current charging voltage, and then the communication data packet including the current charging state and the current battery voltage is sent to the charging box, so that it is convenient for the charging box to determine the target communication frequency according to the current charging state in the communication data packet, and then adjust the preset communication frequency to the target communication frequency. Thus, the charging box can adjust the charging voltage more accurately, the energy loss of the charging box during the charging process can be further reduced, and the battery life of the Bluetooth earphones can be improved. At the same time, it is also convenient for the charging box to determine the target charging voltage according to the current battery voltage, and then charge the Bluetooth earphones based on the target charging voltage to realize the dynamic adjustment of the charging voltage, which can reduce the energy loss of the charging box during the charging process, thereby increasing the number of times that the charging box can charge the Bluetooth earphones and improve the battery life of the Bluetooth earphones.

Further, based on the first or second embodiment of the charging method applied to Bluetooth earphones, a third embodiment of the charging method applied to Bluetooth earphones according to the present disclosure is proposed.

In this embodiment, after the above step S200, the charging method further comprises:

Step D: acquiring a target communication frequency when detecting communication frequency adjustment of the charging box, and adjusting the data acquisition cycle based on the target communication frequency; and Step E: acquiring the current battery voltage of the Bluetooth earphones according to a data acquisition cycle after adjusted.

In this embodiment, when the Bluetooth earphones detects the communication frequency adjustment of the charging box, it acquires the target communication frequency, adjusts the data acquisition cycle based on the target communication frequency, and then acquires the current battery voltage of the Bluetooth earphones according to the adjusted data acquisition cycle, and then performs the subsequent steps. The specific execution process is consistent with the above embodiments and will not be repeated here.

The present disclosure also provides a charging system, which comprises a charging box and Bluetooth earphones.

The charging box is the charging box as described above, and is configured to perform the steps in the embodiments of the first type of charging method as described above. The specific functions and implementation process may refer to the above embodiments and will not be repeated here.

The Bluetooth earphones are the Bluetooth earphones as described above, and is configured to perform the steps in the embodiments of the second type of charging method as described above. The specific functions and implementation process may refer to the above embodiments and will not be repeated here.

This embodiment provides a charging system, which comprises a charging box and Bluetooth earphones. By constructing the above charging system, the charging box can communicate with the Bluetooth earphones to acquire the communication data packet of the Bluetooth earphones, then determine the target charging voltage according to the current battery voltage of the Bluetooth earphones in the communication data packet, and then charge the Bluetooth earphones based on the target charging voltage, thereby realizing the dynamic adjustment of the charging voltage of the charging box. Compared with using a fixed normal charging voltage, it can reduce the energy loss of the charging box during the charging process, thereby increasing the number of times that the charging box can charge the Bluetooth earphones and improving the battery life of the Bluetooth earphones.

The present disclosure also provides a computer-readable storage medium on which a charging program is stored. When the charging program is executed by a processor, the steps of the first type of charging method as described in any of the above embodiments are realized.

The specific embodiments of the computer-readable storage medium of the present disclosure are basically the same as the above embodiments of the charging method, and will not be repeated here.

The present disclosure also provides a computer-readable storage medium on which a charging program is stored. When the charging program is executed by a processor, the steps of the second type of charging method as described in any of the above embodiments are realized.

The specific embodiments of the computer-readable storage medium of the present disclosure are basically the same as the above embodiments of the charging method, and will not be repeated here.

It should be noted that, the terms "comprise", "include" or any other variants used herein are intended to cover non-exclusive inclusion, so that the process, method, article or apparatus including a series of elements may not only include those elements, but may also include other elements not stated explicitly, or elements inherent to the process, method, articles or apparatus. Without more limitations, an element defined by the phrase "comprising a . . . " does not exclude the case that there are other same elements in the process, method, article or system including the element.

The above serial number of the embodiments of the present disclosure is only for description and does not represent the advantages and disadvantages of the embodiments.

Through the above description of the embodiments, those skilled in the art can clearly understand that the above embodiment methods can be implemented by means of software plus the necessary general hardware platform. Of course, it can also be implemented by hardware, but in many cases, the former is the better implementation mode. Based on this understanding, the technical solution of the present disclosure, the essence or the part that contributes to the prior art, can be embodied in the form of a software product, which is stored on the above storage medium (such as ROM/RAM, magnetic disc, optical disc), and includes instructions to enable a mobile terminal (which may be a mobile phone, a computer, a server, an air conditioner, or a network device, etc.) to execute the method of each embodiment of the present disclosure.

The above only describes the preferred embodiments of the present disclosure, and does not limit the scope of the patent of the present disclosure. All equivalent substitutions of structure or process made by using the contents of the description and drawings of the present disclosure, or direct or indirect applications in other related technical fields, shall all fall within the scope of protection scope of the present disclosure.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A charging method, applied to a charging box, comprising the following steps:
    acquiring a communication data packet of short distance wireless earphones according to a preset communication frequency when the charging box is charging the short distance wireless earphones, wherein the communication data packet includes a current battery voltage of the short distance wireless earphones;
    determining a target charging voltage according to the current battery voltage; and
    charging the short distance wireless earphones based on the target charging voltage
    wherein the step of determining the target charging voltage according to the current battery voltage comprises:
    obtaining the target charging voltage by adding the current battery voltage and a preset incremental voltage.

2. The charging method according to claim 1, wherein the step of determining the target charging voltage according to the current battery voltage comprises:
    determining a target battery voltage range corresponding to the current battery voltage according to a preset battery voltage range;
    determining a target incremental voltage corresponding to the target battery voltage range according to a mapping relationship between the preset battery voltage range and an incremental voltage; and
    obtaining the target charging voltage by adding the current battery voltage and the target incremental voltage.

3. The charging method according to claim 2, wherein the communication data packet also includes a current charging state of the short distance wireless earphones, and the charging method further comprises:
    determining a target communication frequency according to the current charging state; and
    adjusting the preset communication frequency to the target communication frequency, and acquiring the communication data packet of the short distance wireless earphones according to the target communication frequency.

4. The charging method according to claim 1, wherein the communication data packet also includes a current charging state of the short distance wireless earphones, and the charging method further comprises:
    determining a target communication frequency according to the current charging state; and
    adjusting the preset communication frequency to the target communication frequency, and acquiring the communication data packet of the short distance wireless earphones according to the target communication frequency.

5. A charging box, comprising a memory, a processor and a charging program stored on the memory and operable on the processor, wherein when the charging program is executed by the processor, steps of the charging method according to claim 1 are realized.

6. The charging method according to claim 1, wherein the communication data packet also includes a current charging state of the short distance wireless earphones, and the charging method further comprises:

determining a target communication frequency according to the current charging state; and adjusting the preset communication frequency to the target communication frequency, and acquiring the communication data packet of the short distance wireless earphones according to the target communication frequency.

7. A charging method, applied to short distance wireless earphones, comprising the following steps:

when it is detected that the short distance wireless earphones are placed in a charging box to charge, acquiring a current battery voltage of the short distance wireless earphones according to a data acquisition cycle corresponding to a preset communication frequency, and generating a communication data packet according to the current battery voltage; and sending the communication data packet to the charging box so that the charging box determines a target charging voltage based on the communication data packet and charges the short distance wireless earphones wherein the step of generating a communication data packet according to the current battery voltage comprises:

comparing the current battery voltage with a previous current battery voltage, and determining a current charging state of the short distance wireless earphones according to a comparison result; and generating a communication data packet according to the current charging state and the current battery voltage.

8. The charging method according to claim 7, further comprising:

acquiring a target communication frequency when detecting communication frequency adjustment of the charging box, and adjusting the data acquisition cycle based on the target communication frequency; and acquiring the current battery voltage of the short distance wireless earphones according to a data acquisition cycle after adjusted.

9. The charging method according to claim 7, further comprising:

acquiring a target communication frequency when detecting communication frequency adjustment of the charging box, and adjusting the data acquisition cycle based on the target communication frequency; and acquiring the current battery voltage of the short distance wireless earphones according to a data acquisition cycle after adjusted.

* * * * *